(No Model.)
2 Sheets—Sheet 1.
H. R. ROBBINS.
CAN SOLDERING MACHINE.
No. 250,285.
Patented Nov. 29, 1881.
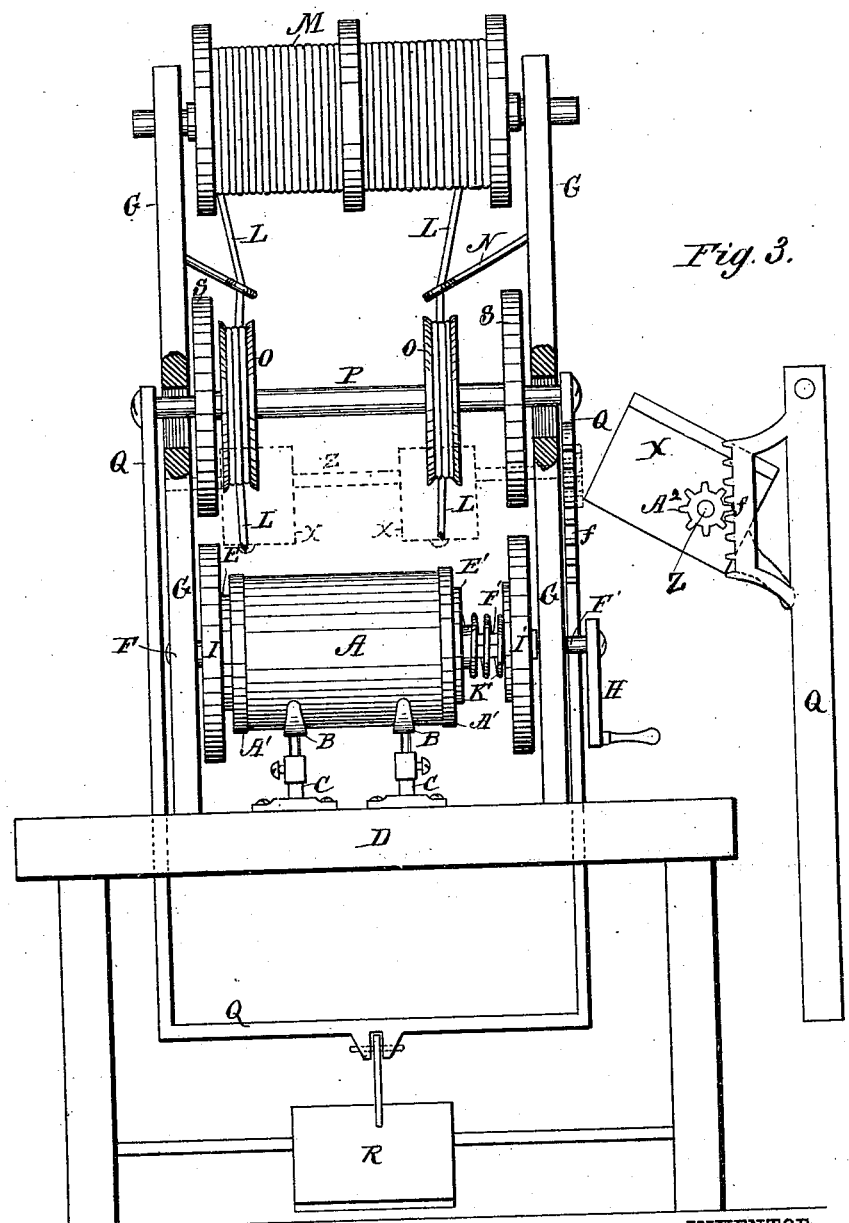
WITNESSES:
W. W. Hollingsworth
Amos W. Hart
INVENTOR:
H. R. Robbins
BY
ATTORNEYS.

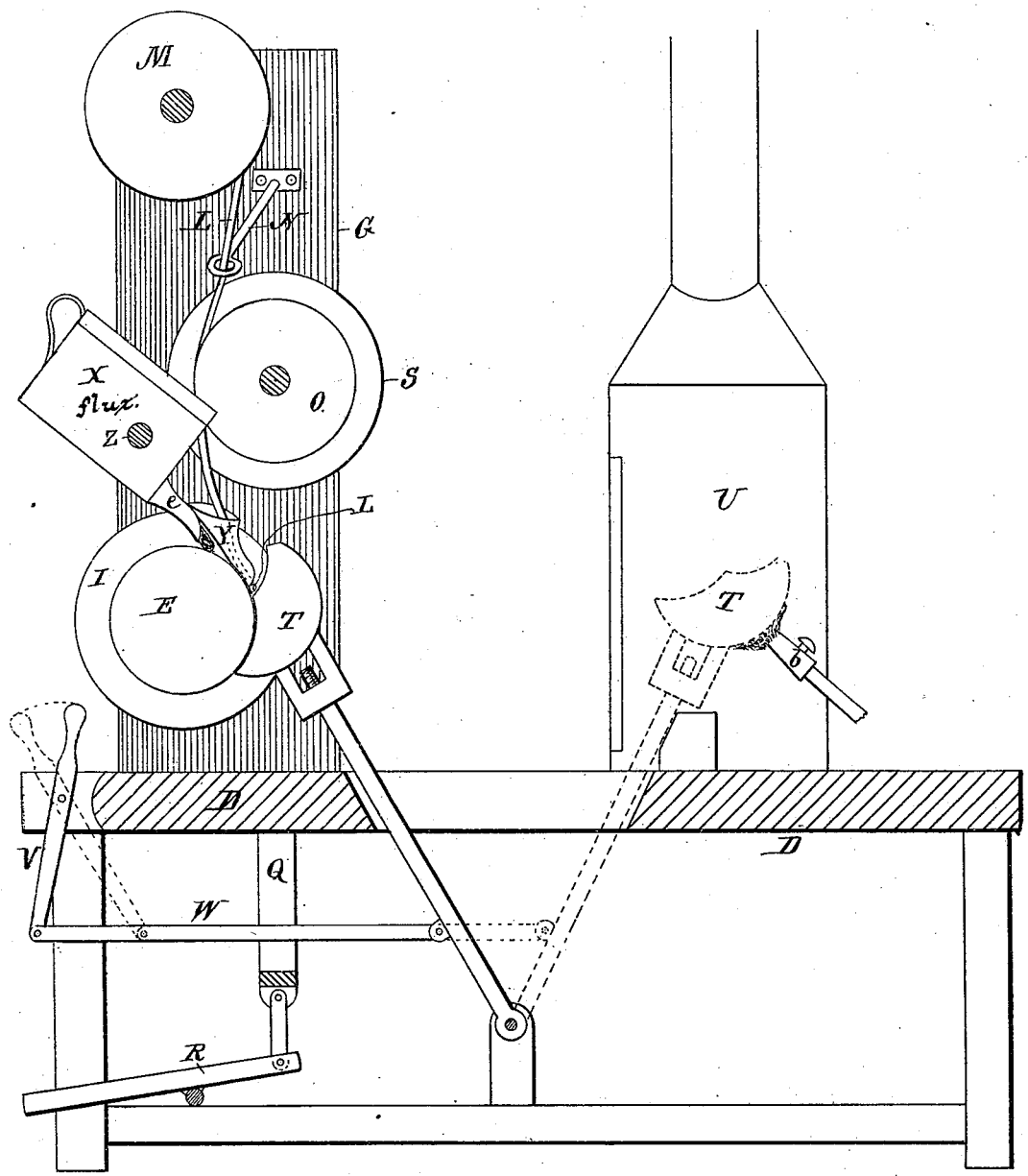

UNITED STATES PATENT OFFICE.

HENRY R. ROBBINS, OF BALTIMORE, MARYLAND, ASSIGNOR TO HIMSELF AND JAMES E. STANSBURY, OF SAME PLACE.

CAN-SOLDERING MACHINE.

SPECIFICATION forming part of Letters Patent No. 250,285, dated November 29, 1881.

Application filed October 5, 1881. (No model.)

*To all whom it may concern:*

Be it known that I, HENRY R. ROBBINS, of Baltimore, in the State of Maryland, have invented a new and useful Improvement in Can-Soldering Machines; and I do hereby declare the following to be a full, clear, and exact description of the same, reference being had to the accompanying drawings, forming a part of this specification.

My invention relates to an improvement in the class of machines adapted for soldering the heads of paint-cans and other cylindrical vessels to the bodies thereof. It is more particularly an improvement in machines which are adapted for using solder-wire, the latter being, preferably, wound upon a rotatable reel, from which it may be drawn off as required and fed into contact with the heated soldering-irons and can-seams. In my machine the wire-reels and mechanism for drawing off the wire therefrom are operated simultaneously with the rotation of the can by means of friction-gearing, which is put in operation by treadle mechanism. The soldering appliances are also arranged for a certain simultaneous and automatic action. The soldering-irons are pivoted and adapted to vibrate between the can-holders and an open furnace, so that they may be swung forward to press on the can-seams, and backward to enter the furnace, where they are heated preparatory to the next operation.

Figure 1 is a front view of the machine, in which portions of the frame are broken away and the flux-holders merely outlined. Fig. 2 is a sectional view of the machine. Fig. 3 is a detail view.

The body A of the can is placed on and supported by crescent-shaped holders B B, that are vertically adjustable on posts C C, fixed on the stationary table D. The heads A' A' of the can are held or clamped against the can-body A by means of disks E E', that are respectively attached to the inner ends of horizontal aligned journals F F', which rotate in fixed bearings in the vertical standards G, which rise from the table D. The right-hand journal F' is adapted to slide axially, and provided with a hand-crank, H, for rotating it and the can that is clamped between the opposite disks E E'.

Friction-wheels I I' are mounted on squared portions of the journals F F', at points intermediate of the disks E E' and frame G. The wheel I is fixed on its journal F, but the wheel I' is necessarily adapted to slide on journal F', in order to allow the aforementioned axial movement of the latter, which is required for clamping and releasing the can. Between the wheel I' and the adjacent disk E' is placed a spiral spring, K, which surrounds the journal and serves to hold the disk pressed firmly against the can, but yields to allow its release.

The solder-wire L is wound on a double reel, M, which is journaled horizontally in the top of standards G. A wire leads off from each section of the reel, passes down through the eye of a fixed guide, N, and is wound one or more times around a peripherally-grooved feed-wheel, O. The latter is mounted fast on a rotatable shaft, P, arranged parallel to the reel and journaled in the upper ends of vertical arms of a frame, Q, that is adapted to be reciprocated vertically by means of a treadle, R, placed beneath the table D. The said arms work through slots in the latter, and the shaft P passes through vertical slots in the fixed standards G, so that it may move vertically when the treadle is operated.

On the shaft P, at points outside the feed-wheels O, are fixed friction-wheels S, which come in contact with the wheels I I' on journals F F when the frame Q is drawn down by operating the treadle.

So far as the machine has been described the operation is as follows: The described parts being held in the position shown in full lines, Fig. 1, by suitable pressure applied to the treadle R, the clamping-disk E' is drawn to the right, (by application of the requisite tractive force to the crank-handle H,) and a can-body, A, with heads A' attached, is placed on the supports B B and clamped between the said disks by the action of spring K. The treadle R being next relieved of pressure, the frame Q descends, thus bringing the pairs of friction-wheels I I' and S S in contact with each other, and the pendent ends of the solder-wires L in contact with the head-joints of the can. Then upon rotating the crank H the can will be rotated simultaneously with the feed-wheels O and the solder-wires L fed or drawn down to a length corresponding to the circumference of the can.

The soldering appliances proper are arranged and operated as follows: Soldering-irons T are pivoted at fixed points on the rear side of the machine. These points are so located that when the irons are swung forward they will rest on the body of the can, as shown in Fig. 2, and when thrown back will pass into a furnace or heater, U, where one or more gas-jets, $b$, impinge on the coppers. Various means may be employed for moving the irons from one position to the other; and I do not desire to restrict myself in that particular. In this instance I show a hand-lever, V, and connecting-rod W arranged for that purpose. Two cans, X, (only one being shown,) containing a suitable liquid flux, are pivoted in supports attached to the standards G, so that they may be tilted forward when required to bring the nicks projecting from their nozzles $e$ into contact with the can A, as shown in Fig. 2. A trumpet-shaped tube, Y, is applied to the nozzle $e$ of each can and moves with it, so as to rest on the can and against the copper T during the soldering operation. The solder-wires L pass through these tubes Y, being thus guided into and held in the required contact with the can and soldering-irons.

Various means may be utilized for tilting the flux-holders X and their attached wire-guides Y. In this instance they are tilted by means of a rack-and-pinion connection with the treadle R—that is to say, the flux-holders are mounted on a horizontal rock-shaft, Z, having a pinion, $A^2$, which engages with a rack, $f$, formed on or attached to one of the vertical arms of the reciprocating frame Q. Therefore, when the latter is drawn down to bring the friction-wheels I I' and S S into contact the flux-holders X and their attached wire-guides Y will also be tilted into the position shown in Fig. 2. The flux-holders are, however, placed eccentrically on shaft Z, so that they would tilt back of themselves, and which arrangement allows the substitution for the rack and pinion of a strap as a means of connection between the shaft Z and frame Q.

What I claim as new and of my invention is the following:

1. In a soldering-machine, the combination, with means for holding the article to be soldered and irons adapted to press upon its seams, of rotatable feed-wheels and tubes for guiding the wire to the irons, substantially as shown and described.

2. In a soldering-machine, the combination, with rotatable can-holders and irons adapted to press thereon, of a holder for solder-wire, wheels around which it is coiled and by which it is fed to the irons, an adjustable frame for raising and lowering said wheels, and friction-wheels, which are brought in contact when the feed-wheels are thus lowered, and thereby caused to rotate the latter, substantially as shown and described.

3. In a soldering-machine, the combination, with rotatable can-holders and soldering-irons adapted to be brought in contact with the can-seams, of a rotatable reel for holding solder-wire, a feed-wheel around which the wire is wound, friction-gearing mounted on the shaft of such feed-wheels and on journals of the can-holders, and a movable frame for moving said friction-gearing into and from contact, as required, for drawing off the wire, and devices for guiding the wire to the can-seams and irons, substantially as shown and described.

4. In a soldering-machine, the combination, with the rotatable reel and can-holders and the soldering-irons, of the peripherally-grooved feed-wheels O and friction-wheels S, the shaft P, on which the same are mounted, the vertically-adjustable frame Q, in which said shaft has its bearings, friction-wheels mounted on the journals of the can-holders, and means for moving the frame Q for bringing the vertically-opposite friction-wheels in contact, so that the operation of the same may feed the wire, as required.

5. In a soldering-machine, the combination of a solder-wire holder, and standards G supporting it, means for feeding and guiding the wire, stationary can-supports B B, and table D, in which the latter are fixed, a vertically-movable frame, Q, for raising and lowering the upper feed-wheels and guides for the solder-wire, said frame working through slots in the table, all as shown and described.

6. In a soldering-machine, the combination of the friction-wheels S S with the can-holder journals having squared portions, the fixed can-supports B B, and friction-wheels I I', feed-wheels O, and a frame for moving said wheels S O, as shown and described.

7. In a soldering-machine, the combination, with can-holders and soldering-irons, of a flux-holding can and a solder-wire guide adapted to be moved for bringing them into the required relation to the can-seams and irons, substantially as shown and described.

8. In a soldering-machine, the combination, with rotatable can-holders and soldering-irons for coacting therewith, of the tilting flux-holders, the tubular wire-guides attached thereto, and devices for changing their position, as required, for perfecting the operation of soldering, as specified.

9. In a soldering-machine, the combination of the tilting flux-holder and treadle D, and means for connecting the same, with rotatable can-holders, as and for the purpose specified.

10. In a soldering-machine, the combination, with rotatable can-holders and a furnace, of soldering-irons, which are pivoted between them, as shown and described, whereby the said irons rest on the can when thrown forward, and enter the furnace when adjusted in the reverse position, as shown and described.

11. The combination, with the can-holders, a furnace, and the iron which is pivoted between them, as shown, of the pivoted hand-lever arranged in front of said can-holders, and a rod for connecting it with the iron, as and for the purpose specified.

HENRY R. ROBBINS.

Witnesses:
WILLIAM T. JACKSON,
EDWARD H. RAY.